United States Patent [19]

Stockinger et al.

[11] 3,925,407

[45] Dec. 9, 1975

[54] TRIGLYCIDYL COMPOUNDS AND THEIR USE

[75] Inventors: Friedrich Stockinger, Therwil; Friedrich Lohse, Oberwil, both of Switzerland

[73] Assignee: Ciba-Geigy Corporation, Ardsley, N.Y.

[22] Filed: Sept. 27, 1974

[21] Appl. No.: 509,876

[30] Foreign Application Priority Data

Oct. 10, 1973 Switzerland.................... 14394/73

[52] U.S. Cl............................. 260/309.5; 260/2 EP
[51] Int. Cl.²...................................... C07D 49/32
[58] Field of Search................................ 260/309.5

[56] References Cited

UNITED STATES PATENTS

| | | | |
|---|---|---|---|
| 3,631,221 | 12/1971 | Batzer et al.................. | 260/309.5 X |
| 3,821,243 | 6/1974 | Habermeier..................... | 260/309.5 |

*Primary Examiner*—Ethel G. Love
*Attorney, Agent, or Firm*—Vincent J. Cavalieri

[57] ABSTRACT

New N,N-heterocyclic triglycidyl compounds are obtained by glycidylating, in a known manner, 3-(2',3'-dihydroxypropyl)hydantoin which is unsubstituted or substituted in the 5-position. The new triglycidyl compounds are viscous materials and can be cured with epoxide resin curing agents to give flexible products of high flexural strength.

6 Claims, No Drawings

TRIGLYCIDYL COMPOUNDS AND THEIR USE

The present invention relates to N-heterocyclic triglycidyl compounds based on certain hydantoin derivatives, a process for the manufacture of these triglycidyl compounds and the use of the triglycidyl compounds, mixed with curing agents for epoxide resins, such as amines or polycarboxylic acids, for the manufacture of shaped articles, coverings or coatings.

Triglycidyl compounds of N-heterocyclic compounds are known. Triglycidyl isocyanurate, which is manufactured according to the processes described in German Patent Specifications Nos. 1,180,373 and 1,211,650 has an almost theoretical epoxide content and is crystalline. Since triglycidyl isocyanurate only starts to melt above 100°C, its further processing, in industrial applications, entails distinct disadvantages. Thus, for example, only dicarboxylic acids can be employed as curing agents for the manufacture of solvent-free casting resins, because amines react too vigorously at the melting point of triglycidyl isocyanurate, and hence usable shaped articles are not obtained.

German Offenlegungsschrift No. 2,217,914 furthermore has disclosed triglycicyl compounds based on compounds containing two N-heterocyclic rings. These compounds, which are viscous substances, however have the disadvantage that the mechanical properties of the cured products do not in every respect satisfy the demands made of them.

It has now been found that glycidylation of certain 3-(2′,3′-dihydroxypropyl)-hydantoin derivatives gives good yields of the corresponding triglycidyl compounds, which are viscous materials and can, surprisingly, be cured to give more flexible products of higher flexural strength.

Accordingly, the present invention relates to triglycidyl compounds of the formula I

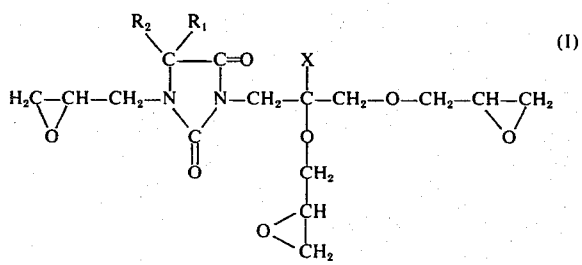

wherein X denotes a hydrogen atom or the methyl group and $R_1$ and $R_2$ independently of one another each denote a hydrogen atom or an alkyl, alkenyl, cycloalkyl or phenyl radical which can be substituted, or wherein $R_1$ and $R_2$ together denote the tetramethylene or pentamethylene radical.

In the formula I, X preferably denotes a hydrogen atom or the methyl group and $R_1$ and $R_2$ independently of one another preferably each denote a hydrogen atom or an alkyl group with 1–4 C atoms, or together denote the pentamethylene radical.

The triglycidyl compounds of the formula I are obtained by addition reaction of 3 mols of an epihalogenohydrin, preferably epichlorohydrin, with 1 mol of a compound of the formula II

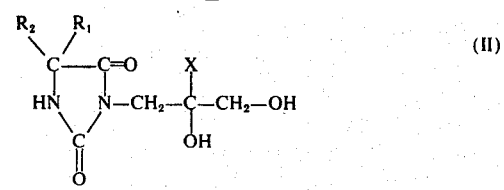

wherein X, $R_1$ and $R_2$ have the same meaning as in the formula I, in the presence of a catalyst, and subsequent dehydrohalogenation of the halogenohydrin compound in the presence of agents which split off hydrogen halide, such as strong alkalis, for example anhydrous sodium hydroxide or aqueous sodium hydroxide solution, to give the triglycidyl compound.

Preferably, this process starts from compounds of the formula II, wherein X denotes a hydrogen atom or the methyl group and $R_1$ and $R_2$ independently of one another each denote a hydrogen atom or an alkyl group with 1–4 C atoms or together denote the pentamethylene radical.

The addition reaction of the epihalogenohydrin with the compounds of the formula II can be carried out in the presence of either acid or alkaline catalysts. Under certain circumstances it is also possible to work without a catalyst. Suitable catalysts for the addition reaction of epichlorohydrin are above all tertiary amines, such as triethylamine, tri-n-propylamine, benzyldimethylamine, N,N′-di-methylaniline and triethanolamine; quaternary ammonium bases, such as benzyltrimethylammonium hydroxide; quaternary ammonium salts, such as tetramethylammonium chloride, tetraethylammonium chloride, benzyltrimethylammonium chloride, benzyltrimethylammonium acetate and methyltriethylammonium chloride; hydrazines with a tertiary nitrogen atom, such as 1,1-dimethylhydrazine, which can also be employed in the quaternised form; alkali metal halides, such as lithium chloride, potassium chloride, sodium chloride, sodium bromide or sodium fluoride; and also ion exchange resins with tertiary or quaternary amino groups, as well as ion exchangers with acid amide groups.

As agents which split off hydrogen halide it is possible to use sodium hydroxide solution or anhydrous sodium hydroxide, or other strong alkaline reagents, such as potassium hydroxide, barium hydroxide, calcium hydroxide, sodium carbonate or potassium carbonate.

The addition reaction of the epihalogenohydrin with the compounds of the formula II can be carried out with or without solvents, with an excess of epichlorohydrin, at temperatures of up to 140°C, under the action of one of the catalysts mentioned, in 30 to 360 minutes. The subsequent dehydrohalogenation can be carried out at 40° to 70°C with solid or liquid alkalis and, if appropriate, whilst azeotropically distilling off the water formed. The alkali halide is separated off in a known manner. The resulting triglycidyl compounds are isolated by distilling off the excess epihalogenohydrin and the solvent used, if any. They are obtained as viscous resins in yields of up to 100%.

The dihydroxy compounds of the formula II are also new compounds and can be obtained by reacting 1 mol of a compound of the formula III

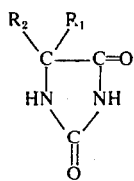

(III)

or if the corresponding monoalkali metal salt of this compound, preferably the monosodium salt or monopotassium salt, with 1 mol of a compound of the formula IV

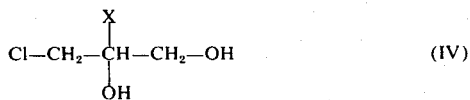

(IV)

in the presence of a basic catalyst. This reaction also takes place without catalysts. As a rule, the reaction temperature in this addition reaction is between 50° and 180°C. The reaction of a compound of the formula III with a compound of the formula IV can also be carried out under pressure, that is to say in an autoclave. Preferably, the reaction is carried out in an organic solvent, such as dimethylformamide, toluene, dioxane or halogenated hydrocarbons.

The basic catalysts used in this reaction are preferably sodium hydroxide solution or potassium hydroxide solution. However, it is also possible to use other strongly alkaline reagents, such as barium hydroxide, calcium hydroxide, sodium carbonate or potassium carbonate, with advantage.

In addition to being used as starting compounds for the manufacture of triglycidyl compounds, the compounds of the formula II can also be converted into highly viscous polyethers and polyesters by polycondensation, or into polyurethanes by reaction with polyisocyanates.

The compounds of the formula III are known and can be manufactured in accordance with the Bucherer-Bergs reaction described in "Chemical Abstracts" 27, 1,001 (1933), by reaction of ketones or aldehydes with alkali metal cyanides and ammonium carbonate. 3-Chloro-1,2-propanediol and 3-chloro-2-methyl-1,2-propanediol are compounds corresponding to the formula IV.

The triglycidyl compounds according to the invention, of the formula I, react with the customary curing agents for epoxide compounds. They can therefore be crosslinked or cured by addition of such curing agents, analogously to other polyfunctional epoxide compounds. Basic or acid compounds can be used as such curing agents.

As suitable curing agents there may, for example, be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3,2,2-bis-(4'-aminocyclohexyl)-propane, 3,5,5-trimethyl-3-(aminomethyl)-cyclohexylamine ("isophoronediamine"), Mannich bases, such as 2,4,6-tris-(dimethylaminomethyl)-phenol; m-phenylenediamine, p-phenylenediamine, bis-(4-aminophenyl)-methane, bis-(4-aminophenyl)-sulphone and m-xylylenediamine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine, in excess, and polyepoxides, such as diomethane polyglycidyl ethers; ketimines, for example from acetone or methyl ethyl ketone and bis-(p-aminophenyl)-methane; adducts of monophenols or polyphenols and polyamines; polyamides, especially those from aliphatic polyamines, such ad diethylenetriamine or triethylenetetramine, and dimerised or trimerised unsaturated fatty acids, such as dimerised linseed oil fatty acid (VERSAMID); polymeric polysulphides (THIOKOL); dicyandiamide and aniline-formaldehyde resins; polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenyl phosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, 4-methyl-3,6-endomethylene-$\Delta^4$-tetrahydrophthalic anhydride (= methylnadic anhydride), 3,4,5,6,7,7-hexachloro-3,6-endomethylene-$\Delta^4$-tetrahydrophthalic anhydride, succinic anhydride, adipic anhydride, trimethyladipic anhydride, azelaic anhydride, sebacic anhydride, maleic anhydride, dodecenylsuccinic anhydride; pyromellitic dianhydride or mixtures of such anhydrides.

Curing accelerators can furthermore be employed in the curing reaction, in particular when using polyamides, dicyandiamide, polymeric polysulphides or polycarboxylic acid anhydrides as curing agents; examples of such accelerators are tertiary amines, their salts, or quaternary ammonium compounds, for example 2,4,6-tris-(dimethylaminomethyl)-phenol, benzyldimethylamine, 2-ethyl-4-methylimidazole and triamylammonium phenolate; or alkali metal alcoholates, such as, for example, sodium hexanetriolate.

The invention also relates to curable mixtures which contain a triglycidyl compound according to the invention, of the formula I, optionally together with other polyepoxide compounds, and also curing agents for epoxide resins, such as polyamines or polycarboxylic acid anhydrides.

The triglycidyl compounds according to the invention or their mixtures with other polyepoxide compounds and/or curing agents can be mixed, before curing, with customary modifiers, such as extenders, fillers and reinforcing agents, pigments, dyestuffs, plasticisers, flow control agents, agents for conferring thixotropy, flameproofing substances and mould release agents.

As extenders, reinforcing agents, fillers and pigments which can be incorporated into the curable mixtures according to the invention, there may, for example, be mentioned: coal tar, bitumen, glass fibres, boron fibres, carbon fibres, cellulose, polyethylene powder, polypropylene powder, mica, asbestos, quartz powder, slate powder, aluminium oxide trihydrate, chalk powder, gypsum, antimony trioxide, bentones, silica aerogel (AEROSIL), lithopone, baryte, titanium dioxide, carbon black, graphite, iron oxide or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

Particularly for use in the lacquer field, the new triglycidyl compounds can furthermore be partially or completely esterified in a known manner with carboxylic acids such as, in particular, higher unsaturated fatty acids. It is furthermore possible to add other curable synthetic resins, for example phenoplasts or aminoplasts, to such lacquer resin formulations.

The new triglycidyl compounds of the formula I are also suitable for the manufacture of curable pre-adducts, so-called "B-stage" resins, and for the manufacture of (so-called) "advanced" epoxide resins in accordance with the known "advancement process", wherein a deficiency of curing agent is employed and adducts containing epoxide groups are obtained.

The curable mixtures, in the filled or unfilled state, where appropriate in the form of solutions or emulsions, can be used as laminating resins, paints, lacquers, dipping resins, impregnating resins, casting resins, compression moulding compositions, sintering powders, spreading and surface-filling compositions, floor covering compositions, potting and insulating compositions for the electrical industry, and adhesives, and for the manufacture of such products.

Manufacture of the starting compounds

EXAMPLE A 3-(2',3'-dihydroxypropyl)-5,5-dimethylhydantoin

A mixture of 384 g (3.0 mols) of 5,5-dimethylhydantoin, 217.5 g (1.5 mols + 5% excess) of anhydrous potassium carbonate, 1,200 ml of dimethylformamide and 300 ml of toluene is reacted in a glass flask, equipped with a stirrer, thermometer, reflux condenser and dropping funnel, at 124°–130°C internal temperature (bath temperature 180°C), and the resulting water of reaction is removed continuously from the reaction mixture by azeotropic circulatory distillation. After 4 hours and 30 minutes, the reaction mixture is cooled to 62°C internal temperature and 365 g (3.3 mols) of 3-chloro-1,2-propanediol are added rapidly, whilst stirring, whereupon an exothermic reaction occurs and the temperature rises to 100°C. The reaction mixture is then stirred for 4 hours and 50 minutes at 124°–133°C. The potassium chloride produced is then separated off by filtration and the clear yellow filtrate is concentrated on a rotary evaporator at 20 mm Hg and 90°C. The residue is dried to constant weight at 90°C and 10⁻¹ mm Hg, and 618.5 g of a yellowish, clear, highly viscous crude product are obtained. The crude product is distilled at 0.3 to 0.6 mm Hg and 207° to 215°C. Yield of pure product: 505.8 g (83.4% of theory).

| Elementary analysis: | found: | calculated: |
|---|---|---|
| | 47.30% C | 47.52% C |
| | 7.10% H | 6.98% H |
| | 14.08% N | 13.86% N |

EXAMPLE B 3-(2',3'-dihydroxypropyl)-5,5-Pentamethylenehydantoin

A mixture of 480 g (2.52 mols) of the monosodium salt of 5,5-pentamethylenehydantoin, 291 g (2.63 mols) of 3-chloro-1,2-propanediol and 1,200 ml of dimethylformamide is reacted, analogously to Example A, for 6 hours and 10 minutes at 125°–133°C internal temperature (bath temperature 150°C). Thereafter the reaction mixture, whilst still hot, is separated by filtration from the sodium chloride produced and the clear yellow filtrate is concentrated on a rotary evaporator under a water pump vacuum, in the course of which the product crystallises in the flask. 694.9 g of a crystalline crude product of melting point 153°–155°C are obtained. Recrystallization from water gives 541 g (88.5% of theory) of a colourless, crystalline diol which melts at 156°–160°C.

| Elementary analysis: | found: | calculated: |
|---|---|---|
| | 54.71% C | 54.53% C |
| | 7.54% H | 7.49% H |
| | 11.84% N | 11.56% N |

EXAMPLE C 3-(2',3'-dihydroxy-2'-methylpropyl)-5,5-pentamethylenehydantoin 95.1 g of the monosodium salt of 5,5-pentamethylenehydantoin (0.5 mol), 63.3 g of 3-chloro-2-methyl-1,2-propanediol (0.55 mol) and 200 ml of dimethylformamide are stirred in a reaction flask for 1 hour and 53 minutes at 100°–138°C internal temperature (bath temperature 150°C). The reaction mixture is then worked up analogously to Example B and 138.1 g of a yellowish crystalline crude product which still contains a small proportion of solvent are obtained. Three-fold recrystallisation in water and in acetone gives a pure diol of melting point 163.4° to 165°C.

| Elementary analysis: | found: | calculated: |
|---|---|---|
| | 56.26% C | 56.23% C |
| | 7.79% H | 7.87% H |
| | 10.79% N | 10.93% N |

EXAMPLE D 3-(2',3'-dihydroxypropyl)-5-methyl-5-ethylhydantoin 284 g (2.0 mols) of 5-methyl-5-ethylhydantoin, 145.1 g (1.05 mols + 5% excess) of anhydrous potassium carbonate, 800 ml of dimethylformamide and 200 ml of toluene are reacted for 4 hours and 20 minutes at 124°–129°C internal temperature (bath temperature 180°C) and the water of reaction is continuously separated off by azeotropic circulatory distillation. The heating is then removed and 243.2 g (2.0 mols + 10% excess) of 3-chloro-1,2-propanediol are added dropwise over the course of 11 minutes at 127°–130°C internal temperature, the reaction taking place exothermically. The mixture is allowed to continue reacting for a further 4 hours at 128°–130°C in order to complete the reaction, the potassium chloride formed is separated off by filtration and the filtrate is worked up analogously to Example A. 444.1 g of a clear, brown, viscous crude product are obtained; this product is purified by vacuum distillation at 195°–198°C/0.4–0.8 mm Hg. Yield of pure product: 319.2 g (73.9% of theory).

| Elementary analysis: | found: | calculated: |
|---|---|---|
| | 49.88% C | 49.99% C |
| | 7.70% H | 7.46% H |
| | 12.97% N | 12.96% N |

Manufacture of the Triglycidyl Compounds

EXAMPLE 1

A mixture of 48.4 g (0.2 mol) of 3-(2′,3′-dihydroxypropyl)-5,5-pentamethylenehydantoin (prepared according to Example B), 555 g (6.0 mols) of epichlorohydrin and 0.6 g of tetramethylammonium chloride is stirred for 1 hour in a glass flask, equipped with a stirrer, thermometer, reflux condenser and dropping funnel, at 115°–117°C internal temperature (bath temperature 160°C). The mixture is cooled to 60°C and 60.0 g of 50% strength aqueous sodium hydroxide solution are then added dropwise over the course of 3 hours whilst stirring well. At the same time the water present in the reaction mixture is removed continuously by azeotropic circulatory distillation. After dropwise addition of the sodium hydroxide solution, distillation is continued for a further 30 minutes, the reaction mixture is then cooled to room temperature, the sodium chloride which has precipitated is filtered off and the epichlorohydrin solution is extracted by shaking with 100 ml of water. After separating off the aqueous phase, the epichlorohydrin solution is concentrated on a rotary evaporator at 65°C under a water pump vacuum. The product is then dried to constant weight at 65°C and $10^{-1}$ mm Hg.

76.8 g (87.2% of theory) of a clear, brownish, viscous resin having a epoxide content of 6.37 epoxide equivalents/kg and a viscosity of 33,800 cP (at 25°C) are obtained. The chlorine content of the product is 0.87%.

The proton-magnetic resonance spectrum (H-NMR) is in accord with the following formula:

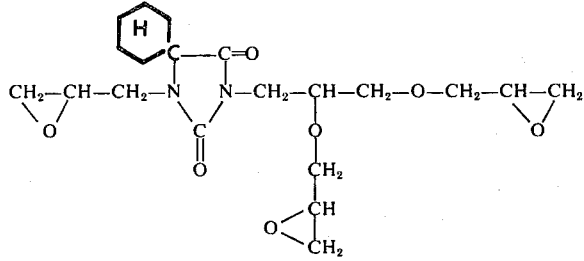

EXAMPLE 2

Analogously to Example 1, a mixture of 60.7 g (0.3 mol) of 3-(2′,3′-dihydroxypropyl)-5,5-dimethylhydantoin (prepared according to Example A), 666 g of epichlorohydrin (7.2 mols) and 0.8 g of tetramethylammonium chloride is stirred for 1 hour at 118°C and is then cooled to 60°C internal temperature. 90.0 g of 50% strength aqueous sodium hydroxide solution are then added dropwise, analogously to Example 1, over the course of 3 hours whilst stirring well and carrying out an azeotropic circulatory distillation. The mixture is worked up analogously to Example 1 and 110 g of a brownish, viscous resin (99.0% of theory) with 6.76 epoxide equivalents/kg (83.5% of theory) are obtained.

The elementary analysis and H-NMR spectrum confirm that the new triglycidyl compound has the following formula:

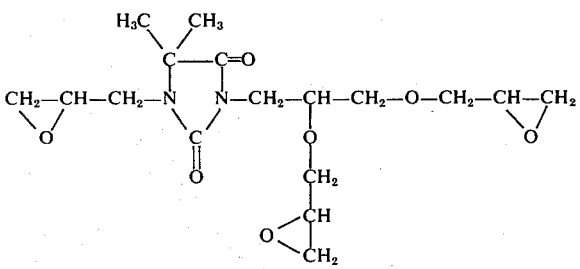

EXAMPLE 3

A mixture of 51.3 g (0.2 mol) of 3-(2′,3′-dihydroxy-2′-methylpropyl)-5,5-pentamethylenehydantoin (prepared according to Example C), 555 g (6.0 mols) of epichlorohydrin and 0.5 g of tetramethylammonium chloride is stirred for 1 hour at 117°C. The reaction mixture is then cooled to 60°C and 60 g of 50% strength aqueous sodium hydroxide solution are added dropwise over the course of 3 hours whilst stirring well and continuously removing the water of reaction from the reaction mixture by azeotropic circulatory distillation.

The mixture is worked up analogously to Example 1 and 82.9 g of a brownish, viscous resin (97.7% of theory) having an epoxide content of 5.73 epoxide equivalents/kg and a viscosity of 32,000 cP (at 25°C) are obtained.

The elementary analysis and H-NMR spectrum confirm that the new triglycidyl compound corresponds to the following formula:

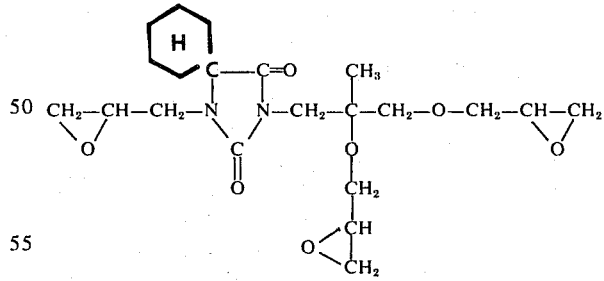

EXAMPLE 4

108.1 g (0.5 mol) of 3-(2′,3′-dihydroxypropyl)-5-methyl-5-ethylhydantoin (prepared according to Example D), 1,387.5 g (15.0 mols) of epichlorohydrin and 1.5 g of tetramethylammonium chloride are stirred for 1 hour at 116°–117°C. Analogously to Example 1, 150 g of 50% strength aqueous sodium hydroxide solution are added dropwise over the course of 3 hours and 10 minutes at 60°C and the water is eliminated from the system. After working up, analogously to Example 1, 185 g of a clear, brownish, viscous resin (96.3% of theory), having an epoxide content of 6.67 epoxide equivalents/kg (85.5% of theory) are obtained. The H-NMR spectrum confirms the following formula:

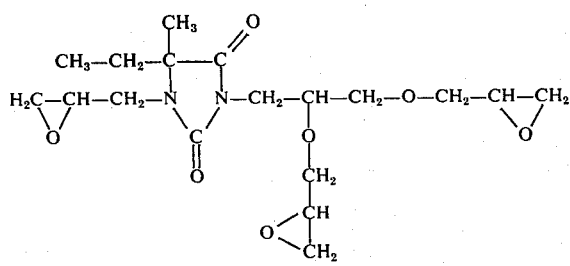

Use Examples

EXAMPLE I 100 parts of 1-glycidyl-3-(2',3'-bis-(glycidyloxy)-propyl)-5,5-pentamethylenehydantoin prepared according to Example 1 and 93.2 parts of hexahydrophthalic anhydride are stirred together at 50°C to form a homogeneous melt. This is poured into aluminium moulds, pre-warmed to 120°C, of dimensions 120 × 120 × 4 mm and 120 × 15 × 10 mm. Curing takes place in 2 hours at 120°C and 16 hours at 150°C. Mouldings having the following mechanical properties are obtained:

| | |
|---|---|
| Flexural strength (according to VSM* 77,103) | 12.4–14.5 kp/mm² |
| Deflection (according to VSM 77,103) | 6.4–7.4 mm |
| Impact strength (according to VSM 77,105) | 12.3–13.5 kpcm/cm² |
| Heat distortion point (according to DIN** 53,458) | 131°C |
| Water absorption (1 hour at 100°C) | 0.3% |

*VSM = Verein Schweizerischer Maschinenindustrieller
**DIN = Deutsche Industrie-Norm

Comparison Examples a. A mixture is prepared from 100 g of industrially manufactured triglycidyl isocyanurate with 9.3 epoxide equivalents/kg and 135 g of hexahydrophthalic anhydride, and is fused at 100°C. The melt, which still contains insoluble crystalline constituents, is poured into aluminium moulds prewarmed to 100°C. During takes place in 2 hours at 100°C, 2 hours at 120°C and 11 hours at 150°C. The resulting mouldings have the following properties:

| | |
|---|---|
| Flexural strength (VSM 77,103) | : 9–10 kp/mm² |
| Deflection (VSM 77,103) | : 5–6 mm |
| Impact strength (VSM 77,105) | : 5–7 cmkp/cm² | b. 190 g of a triepoxide described in German Offenlegungsschrift No. 2,217,914, of the formula

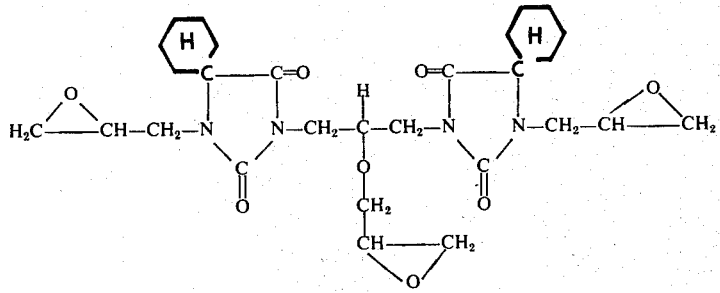

containing 5.26 epoxide equivalents/kg, are mixed with 146.5 g of hexahydrophthalic anhydride and the mixture is fused at 50°C. The melt is cured analogously to comparison example (a). Mouldings having the following properties are obtained:

| | |
|---|---|
| Flexural strength (VSM 77,103) | : 10.8–12.0 kg/mm² |
| Deflection (VSM 77,103) | : 4–5 mm |
| Impact strength (VSM 77,105) | : 10.5–11.75 cmkp/cm². |

We claim:
1. Triglycidyl compounds of the formula I

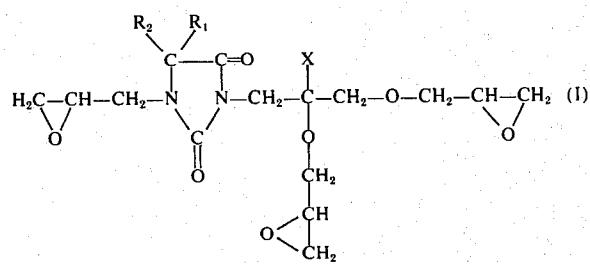

wherein X denotes a hydrogen or methyl and $R_1$ and $R_2$ independently of one another each denote a hydrogen, alkyl, alkenyl, cycloalkyl or phenyl, which can be substituted, or wherein $R_1$ and $R_2$ together denote the tetramethylene or pentamethylene.

2. Triglycidyl compounds according to claim 1, wherein, in the formula I, X denotes a hydrogen or methyl and $R_1$ and $R_2$ independently of one another each denote hydrogen or an alkyl with 1–4 C atoms, or together denote pentamethylene.

3. A compound as claimed in claim 1 which is 1-glycidyl-3-[2',3'-bis-(glycidyloxy)-propyl]-5,5-pentamethylenehydantoin.

4. A compound as claimed in claim 1 which is 1-glycidyl-3-[2',3'-bis-(glycidyloxy)-propyl]-5,5-dimethylhydantoin.

5. A compound as claimed in claim 1 which is 1-glycidyl-3-[2',3'-bis-(glycidyloxy)-2'-methylpropyl]-5,5-pentamethylenehydantoin.

6. A compound as claimed in claim 1 which is 1-glycidyl-3-[2',3'-bis-(glycidyloxy)-propyl]-5-methyl-5-ethylhydantoin.

* * * * *